United States Patent [19]

Goerenz et al.

[11] Patent Number: 5,099,105
[45] Date of Patent: Mar. 24, 1992

[54] ELECTRICALLY HEATED AUTOMOBILE GLAZING WITH ELECTRICALLY CONDUCTIVE DECORATIVE FRAME

[75] Inventors: Walter Goerenz, Alsdorf; Achim Muller, Herzogenrath; Wolfgang Schafer, Aachen, all of Fed. Rep. of Germany

[73] Assignee: Saint-Gobain Vitrage International, Courbevoie, France

[21] Appl. No.: 509,238

[22] Filed: Apr. 17, 1990

[30] Foreign Application Priority Data

Apr. 17, 1989 [DE] Fed. Rep. of Germany ....... 3912512

[51] Int. Cl.⁵ .............................................. H05B 3/22
[52] U.S. Cl. .................................. 219/203; 219/543; 338/309
[58] Field of Search ........................ 219/203, 543, 541; 338/308, 309; 427/96

[56] References Cited

U.S. PATENT DOCUMENTS

| | | | |
|---|---|---|---|
| 4,654,067 | 3/1987 | Ramns et al. | 65/60.5 |
| 4,744,844 | 5/1988 | Hurst | 219/203 |
| 4,802,902 | 4/1989 | Gillery | 219/203 |
| 4,910,380 | 3/1990 | Reiss et al. | 219/203 |
| 4,929,493 | 5/1990 | Tunker | 428/207 |

Primary Examiner—C. L. Albritton
Assistant Examiner—John A. Jeffery
Attorney, Agent, or Firm—Oblon, Spivak, McClelland, Maier & Neustadt

[57] ABSTRACT

An electrically heated automobile glazing has a surface coating (14) serving as resistance heater and a frame-shaped decorative layer (15) of an opaque bakable enamel. Frame-shaped decorative layer (15) consists of an electrically conductive bakable enamel and is in electrically conductive contact with surface coating (14). Current supply conductors (16) are made of thin strips of metal or metallic strips and are in electric contact with decorative layer (15). Surface coating (14) can be deposited between the surface of the glass and decorative layer (15) or between decorative layer (15) and current supply conductor (16).

10 Claims, 2 Drawing Sheets

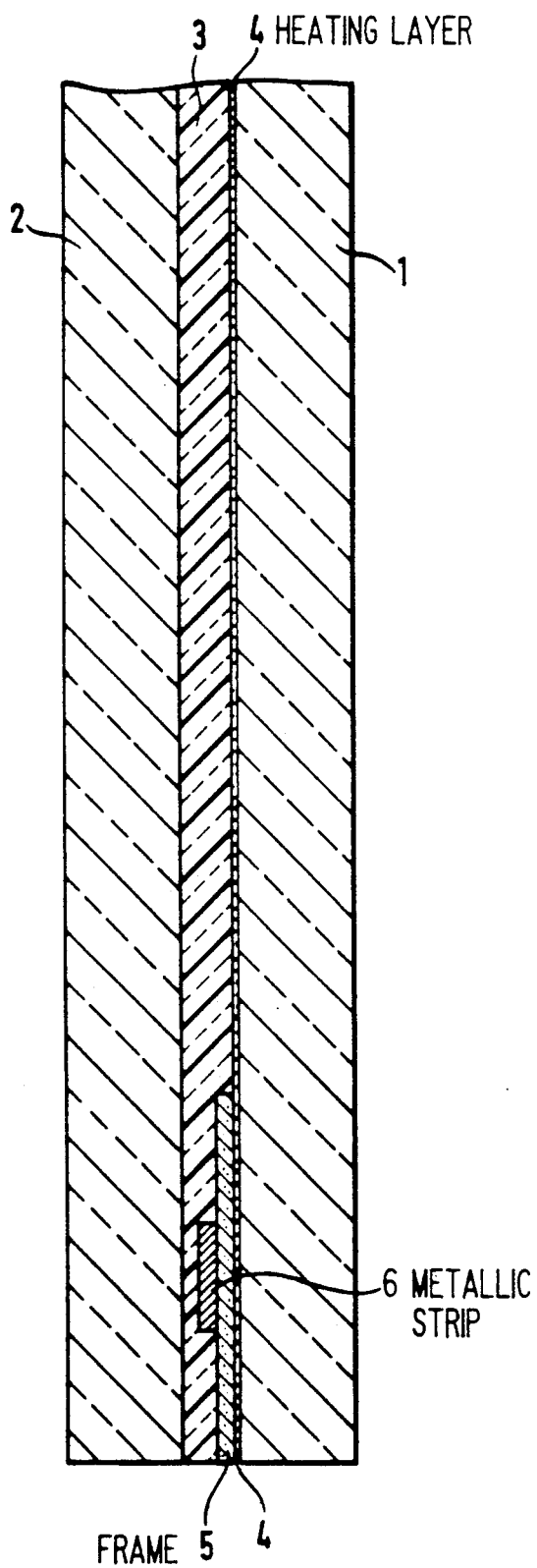
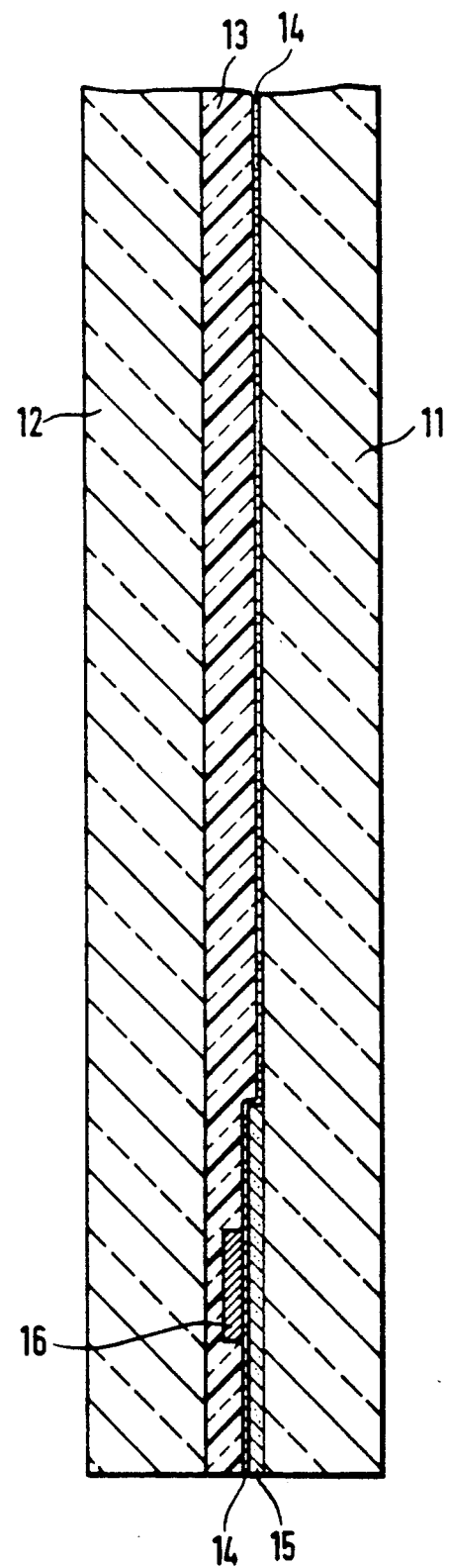

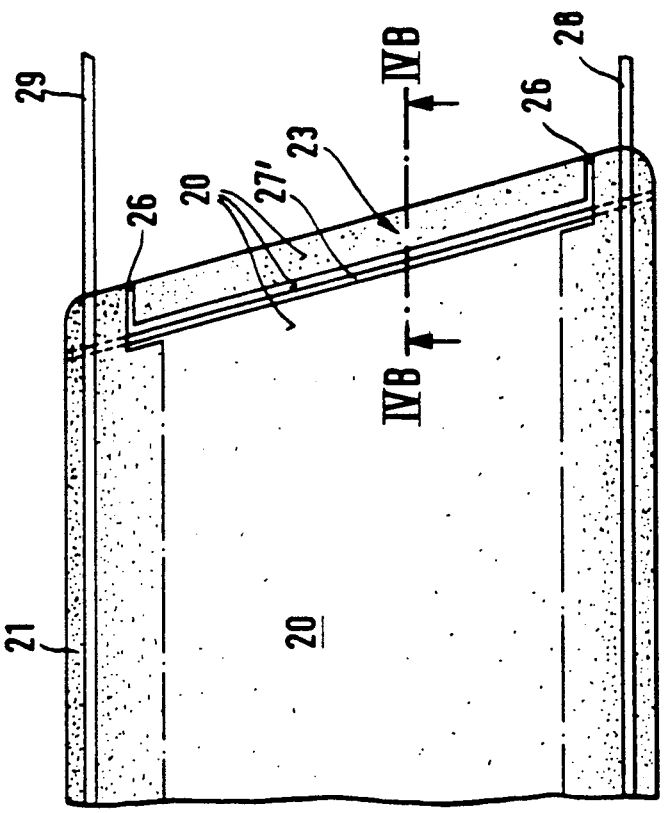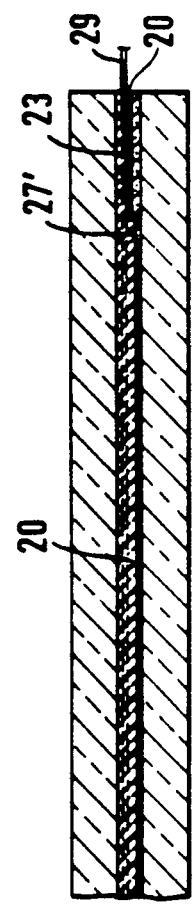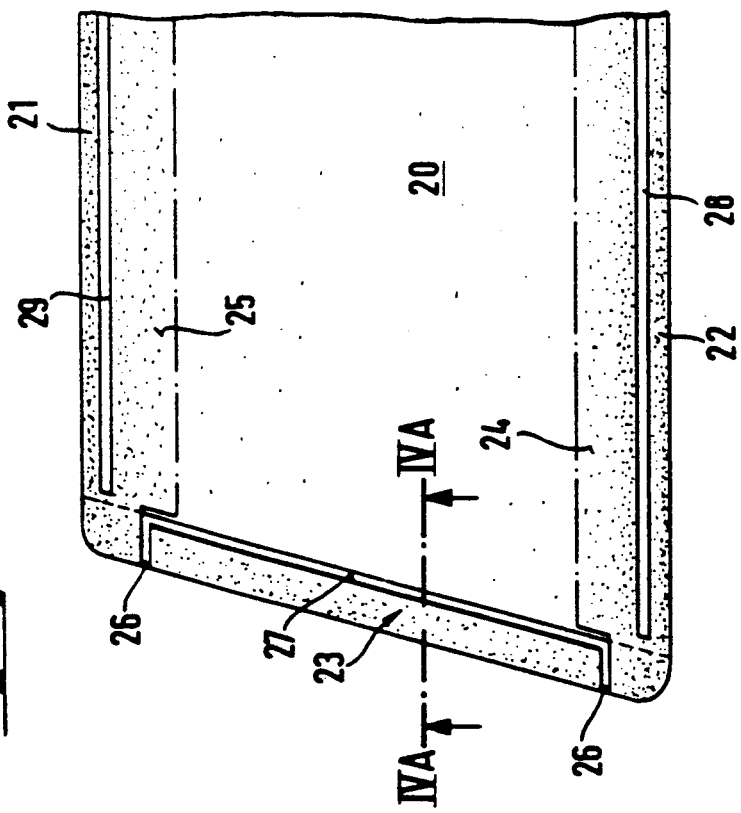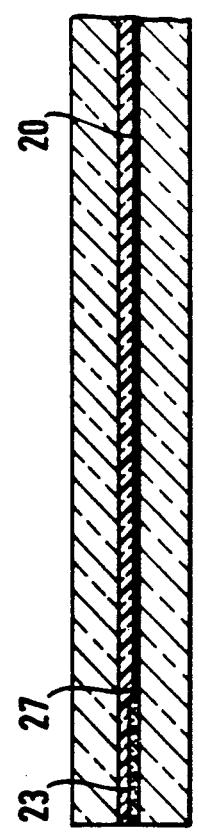

ELECTRICALLY HEATED AUTOMOBILE GLAZING WITH ELECTRICALLY CONDUCTIVE DECORATIVE FRAME

BACKGROUND OF THE INVENTION

1. Field of the Invention

This invention relates to an electrically heated automobile glazing comprising an electrically conductive transparent surface coating serving as a resistance heater, current supply conductors deposited along two opposite edges of the glazing and a decorative frame (frame-forming layer) of an opaque enamel, in particular a bakable enamel.

2. Background of the Related Art

Heated automobile glazings in which the resistance heater is a transparent surface layer are known. Since the transparent heating layer, which as a general rule is a multilayer system having a metallic conductive layer, is advantageously to be protected from mechanical and atmospheric influences, as a general rule it is deposited within a laminated glazing. For example, it can be deposited in a particularly advantageous way directly on the surface of one of the two individual glass sheets forming a laminated glazing, which is connected to the other individual glass sheet by an insert layer of a transparent plastic such as polyvinyl butyral.

When the glass sheets are mounted in the automobile body by a gluing process, they are provided, in addition, with a frame-forming layer of an opaque enamel. This frame-forming layer has as its object to prevent an external view of the adhesive layer. At the same time, this opaque frame protects the adhesive layer from UV rays.

In a known process for the production of such automobile glazings of laminated glass, the frame-forming marginal strip of an opaque bakable enamel is first deposited and dried on the inside surface of the outer glass sheet of the laminate. Then in a second printing operation, an electrically conductive printing paste made of a bakable enamel containing metallic silver is applied to form the current supply bars. After baking the two enamels, the transparent conductive layer is applied, for example by cathode sputtering in a magnetic field, on the glass sheet carrying the opaque frame and current supply bars. Processes of this type are described in detail, for example, in U.S. Pat. Nos. 4,744,844 and 4,654,067.

The known art also comprises the application of the electrically conductive surface coating as a first layer on the glass sheet of the laminate closest to the passenger compartment, on the face of the latter which faces the outside glass sheet, and the application of the current supply bars in the form of strips of a conductive silver paste suitable for printing on the surface coating. The frame-forming opaque marginal strip should, in this embodiment, be deposited on the inside of the outside glass sheet, because it must prevent the viewing of the current supply bars.

The known art also includes conductive black bakable enamels as well as the use of such electrically conductive bakable enamels for printing the strip forming a frame, called a decorative frame, parts of this decorative frame being used directly as heating conductors (U.S. Pat. No. 4,910,380). In this way, the lower part of the decorative frame located in the rest area of the windshield wipers can, for example, serve for heating this area.

For all known automobile glazings with surface heating of the type specified, not only is a double printing operation necessary for application of the decorative frame and for that of the current supply bars but also the two layers applied by printing must be subjected to a drying process in separate operations. The current supply bars applied by printing further have the disadvantageous property that, because of the thinness of the printing layer, the conductive cross section is relatively small, so that in case of high heating energy, the current supply bars are excessively heated.

SUMMARY OF THE INVENTION

The object of the invention is to provide a heated automobile glazing comprising a surface coating, current supply conductors and a decorative frame, so that the production operation as a whole is shortened and at the same time the electrical conductance of the current supply conductors is increased.

According to the invention, this object is achieved by the fact that the frame-forming decorative layer is made from an electrically conductive enamel and is in electrically conductive contact with the surface coating and that the current supply conductors are made from thin strips of metal or metallic strips which are in electric contact with the decorative layer or with the surface coating in the area of the frame-forming decorative layer.

While putting the surface coating in contact with the thin strips of metal or metallic strips often ends, in known embodiments, in a deterioration or even a local destruction of the surface coating immediately at the side of the metallic strip, because of the harmful voltage and current peaks which arise in these areas, the assembly according to the invention not only simplifies the production process but also at the same time eliminates this drawback. Since the electrically conductive decorative frame is in close contact with the surface coating over its entire width, which as a general rule is clearly greater than the width of the usual current supply conductors, a very uniform application of the heating voltage to the surface coating is performed over the entire contact surface. No current or voltage peak therefore appears on this contact surface. This effect of uniform application of the current occurs not only when the decorative frame is deposited between the surface coating and the supply conductors but also when the decorative frame is deposited on one side of the surface coating and the current supply conductors are on the other side of the surface coating relative to the decorative frame.

When the surface conductivity of the frame-forming decorative layer is greater than the conductivity of the surface coating, i.e., when the surface resistance of the decorative layer is less than the surface resistance of the surface coating, the lateral areas located between the current supply conductors of the frame-forming decorative layer are advantageously separated by interruptions to form frame parts. The latter prevents these areas from being heated in an undesirable way.

However, the invention can also be achieved by application of a frame-forming decorative layer whose surface resistance is almost of the same order of magnitude as that of the surface coating. In this case, the frame-forming decorative layer can have the shape of a continuous frame, i.e., without the interruptions, because a more marked heating of the corresponding areas of the frame is not to be expected in this case.

As enamels or bakable enamels for the frame-forming decorative layer, it is possible to use commercially available compositions or compositions such as those described, for example, in U.S. Pat. No. 4,910,380. By selecting or modifying the composition of the enamel or bakable enamel and, correspondingly, the thickness of the applied layer, it is possible to easily regulate the surface resistance each time it is necessary or desired.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a view in section in the area of the lower current supply conductor of a first embodiment of a heated laminated glazing;

FIG. 2 is a view in section in the area of a lower current supply conductor of a second embodiment of a heated laminated glazing;

FIGS. 3A and 3B are elevation views of two embodiments of a heated laminated glazing according to the invention, having widened current supply conductors; and FIGS. 4A and 4B are sections through IVA—IVA and IVB—IVB, respectively, in FIGS. 3A and 3B.

DETAILED DESCRIPTION OF THE PREFERRED EMBODIMENTS

Transparent surface coatings for heated automobile glazings, which act as resistance heaters and exhibit a relatively low surface resistance on the order of 3 to 12 ohms per square meter, generally consist of indium-tin oxide or a system of layers having a metal layer, in particular a metallic silver layer, inserted between oxide layers.

In the case of the embodiment illustrated in FIG. 1, a section of the lower area of a glazing (windshield) of laminated glass is shown. The glazing of laminated glass comprises silicate glass sheet 1 which, in the assembled state of the windshield, is directed toward the outside, silicate glass sheet 2 which, in the assembled state, is directed toward the passenger compartment, and thermoplastic insert layer 3 of polyvinyl butyral which joins the two silicate glass sheets 1 and 2 to one another. Outside silicate glass sheet 1 is provided, on its face adjacent to insert layer 3, with a continuous surface coating 4 acting as resistance layer extending to the edges of the glass sheet. A nontransparent decorative frame 5 of electrically conductive enamel is printed on surface coating 4. In particular, decorative frame 5 can consist of a bakable enamel, i.e., an enamel able to be printed by silk-screening, which is then baked at high temperatures. The electrical conductivity of decorative frame 5 is not critical, but advantageously should be high enough not to cause a voltage drop between metallic strip 6 and heating layer 4. The flow of the heating current supply going from metallic strip 6 to heating layer 4 thus will not be impeded by the resistance of decorative frame 5.

When the surface resistance of decorative frame 5 is less than that of heating layer 4, the lateral areas of decorative frame 5, which are between lower metallic strip 6 and the upper metallic strip (not shown), including those portions overlying or underlying heating layer 4, should have at one or more places a narrow interruption which divides the frame 5 into frame parts and prevents the direct passage of the current between these frame parts.

Metallic strips 6 can be made from thin copper strips or flat copper cords and can, if necessary, be tin-plated. They are applied to decorative frame 5 and are optionally fastened with an electrically conductive adhesive. However, the mechanical contact of metallic strip 6 with decorative frame 5 is sufficient for application of the heating current to decorative frame 5, and the voltage and current peaks resulting from a nonuniform contact at the interface between metallic strip 6 and decorative frame 5 do not cause visible damage to the inside of decorative frame 5. However, a close contact over the entire surface, and the resulting more uniform voltage or current values, minimizes deterioration of the sensitive heating layer 4 at the critical interface between decorative frame 5 and heating layer 4.

For production of the heated laminated glazing shown in FIG. 1, a large plane glass sheet is provided with surface coating 4, glass sheet 1 is cut in the desired shape from the coated glass sheet and decorative frame 5 is applied as an enamel by silk-screening to the coated glass sheet 1. After drying of the printing enamel, this enamel is baked by heating of glass sheet 1. Glass sheet 1 is then placed on glass sheet 2 and the two glass sheets are bent into the desired shape at a temperature of about 600° C. After cooling the bent glass sheets, a metallic strip 6 is applied along the upper and lower edges of the glass sheet on decorative frame 5 and is fastened, if necessary, by an electrically conductive adhesive. Metallic strips 6 project from one side of the glass sheet and act as current supply conductors. Glass sheets 1 and 2 are then assembled with a polyvinyl butyral film 3 and are hot joined under pressure in a known way in an autoclave.

In the embodiment illustrated in FIG. 2, individual glass sheet 11 of the laminated glazing is again the glass sheet of a windshield which is directed outward, while individual glass sheet 12 is directed toward the passenger compartment. The two glass sheets 11 and 12 are joined via thermoplastic insert layer 13. Decorative frame 15 of electrically conductive bakable enamel is deposited on glass sheet 11 on the surface directed toward insert layer 13. Decorative frame 15 is made in the known way, according to which the bakable enamel is applied by silk-screening to plane glass sheet 11 and is baked. Glass sheet 11, provided with baked decorative frame 15, is placed on a second glass sheet 12 and is bent at the same time as the latter. After bending, the surface of glass sheet 11 having decorative frame 15 is provided with heating layer 14 which, in this case, is on decorative frame 15. Metallic strip 16 is deposited on heating layer 14 in the area of decorative frame 15. It can optionally be fastened by a layer of electrically conductive adhesive. Application of the heating current to heating layer 14 is performed in this way without harmful voltage and current peaks, because it essentially takes place at the interface between decorative frame 15 and heating layer 14, which exhibits a close and uniform contact.

When the parts of the decorative frame participating in the current supply of the heating layer are widened toward the field of vision of the windshield, with a constant total heating power, the specific heating power can be increased in the central zone of the windshield or, with constant heating power in the zone of vision, the total heating power can be reduced. The decorative frame is advantageously provided with a tinting having an opacity decreasing in the direction of the zone of vision by which the transparency of the windshield can be reduced by steps or gradually from the zone of vision to the opaque decorative frame.

FIGS. 3A and 3B illustrate the basic structure of such a windshield having a transition area between the zone of vision heated by heating layer 20 and sections of opaque frame 21 and 22. Decorative frame 23 is provided with transition areas 24, 25 which extend into the vision surface. Of course, in these transition areas, such tinting of the decorative frame can be selected which places parts under stress out of the zone of vision.

Further, the windshield can be made as described in the above embodiments.

In the lateral areas, decorative frame 23 is provided with interruptions 26 preventing the direct passage of the current to frame parts at these lateral areas. However, these interruptions should not be present when the surface resistance of the layer forming the decorative frame is of the same order of magnitude as that of the transparent heating layer. However, when the surface resistance of the decorative frame is less than that of heating layer 20, it is advantageous to act so that heating layer 20, at the boundary of the lateral areas of the decorative frame, ends before the latter (i.e., at delimitation line 27), as shown in FIGS. 3B and 4B. This can be achieved, for example, by sectioning the heating layer with a laser beam at 27' (FIGS. 3B and 4B). It is also possible to mask the areas located on the other side of delimitation lines 27 above or below the lateral areas of the decorative frame during application of heating layer 20, as shown in FIGS. 3A and 4A. This measure serves not only to form the interruptions 26 but also to prevent an undesirable heating in the marginal zone of the glazing.

Metallic strips 28 and 29 project laterally from the laminated glazing and act as current supply connections.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electrically heated glazing for a vehicle, comprising:
   a glass sheet;
   an electrically conductive, transparent, resistance heating coating on one surface of said glass sheet;
   a layer of baked, electrically conductive opaque enamel forming a decorative frame of said glass sheet and being in electrical contact with said coating;
   current supply conductors comprising thin metallic strips deposited on two opposite edges of said glass sheet and in electrical contact with said layer forming the frame.

2. The glazing of claim 1 wherein said layer forming the frame is discontinuous at interruptions, thereby forming frame parts in electrical contact with respective ones of said conductors.

3. The glazing of claim 2 including interruptions forming lateral frame parts which are not in electrical contact with said conductors, wherein said coating is not in electrical contact with said lateral frame parts.

4. The glazing of claim 2 wherein said layer forming frame has a surface resistance which is on the same order of magnitude as a surface resistance of said coating.

5. The glazing of claim 1 wherein said frame is wider at said two opposite edges on which said metallic strips are provided than at other edges of the glass plate.

6. The glazing of claim 5 wherein the opacity of said wider frame decreases in a direction toward a central portion of the glass sheet.

7. The glazing of claim 1 including a second glass sheet bonded to the glass sheet via an insert layer applied over said heating coating.

8. The glazing of claim 1 wherein said opaque enamel layer is positioned between said current supply conductors and said resistance heating coating.

9. The glazing of claim 1 wherein said resistance heating coating is positioned between said current supply conductors and said opaque enamel layer.

10. The glazing of claim 2 including at least some of said interruptions forming lateral frame parts which are not in electrical contact with said conductors, wherein said coating is not in electrical contact with said lateral frame parts.

* * * * *